350-377 SR OR 3,142,720 X 4031 T
SEARCH ROOM
T 2674

INVENTOR
EDWARD N. ADAMS

BY Frederick D. Poag
ATTORNEY

United States Patent Office 3,142,720

Patented July 28, 1964

3,142,720

MAGNETO-OPTICAL MEMORY AND DISPLAY DEVICE

Edward N. Adams, White Plains, N.Y., assignor to International Business Machines Corporation, New York, N.Y., a corporation of New York Filed July 28, 1960, Ser. No. 46,011
9 Claims. (Cl. 88—61)

This invention relates to magneto-optic devices and more particularly to an improved magneto-optic material adapted for incorporation in such devices.

The Faraday and Kerr magneto-optic effects have been long known and it has now become generally agreed that these two effects result form the same fundamental physical mechanism. In each effect polarized light is rotated by and upon transmission in a magnetized medium with propagation direction parallel to the magnetization therein. More accurately stated, the light is broken into two components the useful one of which is polarized transversely to the original direction of polarization and has a phase that is reversible in accordance with the polarity of the magnetic field. If the light is transmitted through the medium, the effect is called the Faraday magneto-optic effect, and if it is reflected from the medium, it is called the Kerr magneto-optic effect. The aforementioned reversible vector or component is called the Faraday component or the Kerr component, respectively.

There has been interest in the Kerr effect because reflectors employing this phenomenon may be made in thin film form thereby providing shape anisotropy whereby the material has opposite states of residual magnetism, i.e. has an "easy axis" of magnetization. Thus the material has a memory characteristic which may be employed in or in association with binary devices.

Since the transit distance of the light within the body of the Kerr reflector is short, it is necessary, for a significant effect, that the magnetization within that body be rather intense, and for this reason as well as to provide the aforementioned memory characteristics, attempts have been made to employ ferromagnetic material for the body of the Kerr reflector. Accordingly, experiments have been made with iron, nickel-iron and manganese bismuth; unfortunately the Kerr rotation or effect in iron or nickel-iron has been found to be impracticably small for providing an efficient intensity contrast device, while the coercive force value of manganese bismuth is so high that impracticably large external fields are needed to switch the material from one to another of its states of remanent or residual magnetism.

The problem, therefore, in providing a practicable Kerr reflector is to discover the mechanism underlying the Kerr effect and to construct materials and reflector devices in which a large Kerr effect is present coincidentally with a manageably low coercive force characteristic.

The rotatory power of the medium as measured by the Verdet constant $$\frac{d\Psi F}{dx}$$

(the specific rotation of polarization per unit length of travel of light in the material) can be expressed in the formula—

$$\frac{d\psi F}{dx} = -R_e\left\{\sqrt{K_0}\,\frac{iK_1}{2K_0}\,(\hat{m}\cdot\hat{u}_k)\right\} \qquad (1)$$

in which $K_0$ is the normal or symmetric part of the (complex) dielectric tensor of the medium, $K_1$ the rotatory or antisymmetric part of the (complex) dielectric tensor of the medium, $\hat{m}$ is the unit direction vector of magnetization, and $\hat{u}_k$ is the unit direction vector of propagation of the light. In the lower frequency regions for which the dielectric constant is dominated by electrical conductivity contributions the Verdet constant simplifies to—

$$\frac{d\psi F}{dx} = \sqrt{\frac{2\pi}{\omega}}\,\frac{\sigma_1}{\sqrt{\sigma_0}}\cos(\hat{m},\hat{k}) \qquad (2)$$

where $\omega$ is the angular frequency of the light, $\sigma_0$ is the normal electrical conductivity, $\sigma_1$ is the rotatory or Hall part of the conductivity, and cos $(\hat{m}, \hat{k})$ is the cosine of the angle between the direction of propagation and the direction of magnetization. A more complex formula than Equation 2 is required to accurately represent Equation 1 in the entire visible region, where for some materials $K_0$ and $K_1$ contain additional contributions from atomic polarizability and atomic absorption process. For such materials Equation 2 is only an approximation, which, however, gives a correct rough estimate of the dependence of the rotation on $\sigma_0$.

From the above I have concluded that the magneto-optic effect is a positive function of the term $K_1$ over the square root of $K_0$, wherein $K_1$ is a positive function of $\gamma \cdot S$, $\gamma$ being the spin orbit coupling of the atoms responsible for the effect and S being the spin of the electrons whose coupling is significant, and $K_0$ being a positive function of the intrinsic conductivity, $\sigma_0$. It will be observed, then, that the magneto-optic effect can be increased by increasing $K_1$ or by decreasing $K_0$ and that if these two operations are undertaken in concert, the benefit will be the product of the two changes.

Turning first to enlargement of $K_1$, it is possible to enlarge the spin-orbit coupling by introducing atoms of higher atomic number. Because of the requirement of ferromagnetism, it is required that these atoms have outer orbit *d* and/or *f* electrons, that is, that they be atoms of a transition or rare earth series element. It is not necessary that the element introduced be ferromagnetic in and of itself, but only that it be compatible with and in a ferromagnetic environment so as to form a ferromagnetic alloy or metallic compound therewith. Elements of the higher transition and rare earth series fulfill the requirements of containing *d* and *f* valence electrons and having atomic numbers substantially greater than that of iron. Accordingly, such higher series elements may be inserted as an alloying element with first transition series elements, in particular with iron, so as to raise the average spin-orbit coupling. Iron is an especially desirable constituent from the first transition series since iron and certain iron alloys have low coercivity, hence the desired facile switching properties.

Turning to the second problem, that of minimizing $K_0$, the intrinsic conductivity $\sigma_0$ of the Kerr reflector can be reduced, without changing significantly the switching characteristics of the reflector material, by introducing into the reflector means which limit the mean free path of the conduction electrons therein. In accordance with the invention, such means may be provided by the introduction of dielectric material which is transparent to light in a significant degree in the thicknesses employed. For example, the core reflector may be built up as a multilayer film comprising layers of the aforementioned alloy separated wholly or partially by layers of dielectric. In this configuration, the layers of ferromagnetic alloy should be thin compared to the mean free path which would be characteristic of the alloy in bulk.

As aforesaid, when each of (*a*) enlargement of $K_1$ and (*b*) reduction of $K_0$ is undertaken, the improvement is a product of the two improvements rather than mere addition of the two. Accordingly a rather modest improvement in each, such as one order of magnitude, results in an over-all improvement of two orders of magnitude.

Accordingly it is an object of the invention to provide an improved magneto-optic apparatus, including a more efficient and practicable magneto-optic medium.

It is another object of the invention to provide an improved magneto-optic medium as aforesaid having constituents which contribute a large average spin-orbit coupling.

It is another object of the invention to provide a medium as aforesaid in which the effective conductivity is reduced.

It is still another object of the invention to provide improved apparatus as aforesaid wherein the magneto-optic medium has anisotropy and coercivity characteristics similar to those of iron while having spin-orbit coupling characteristics substantially greater than that of iron, and, at the same time, an effective conductivity substantially lower than that of iron, whereby there are provided memory and switching characteristics similar to those of thin iron films together with magneto-optic rotating power materially greater than that of iron films.

The foregoing and other objects, features and advantages of the invention will be apparent from the following more particular description of preferred embodiments of the invention, as illustrated in the accompanying drawings.

Figure 2:
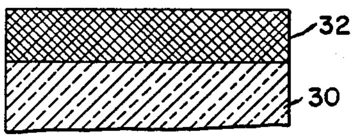
FIG. 2 is a vertically expanded fragmentary cross sectional view of the Kerr reflector in the device of FIG. 1 taken about along line 2—2 of that figure.
Figure 3:
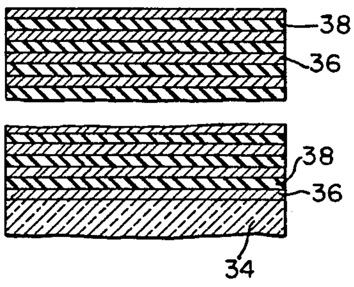
FIG. 3 is a view similar to FIG. 2 but showing an alternative form of reflector.
Figure 4:
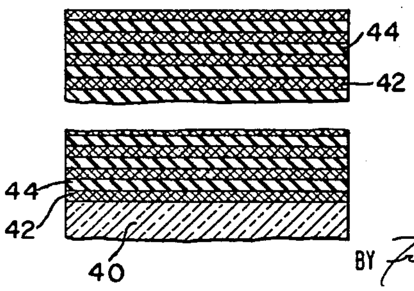
FIG. 4 is a view similar to FIGS. 2 and 3 but showing a reflector structure combining the attributes of the structures of those two figures.

Certain parts illustrated in FIGS. 2, 3, and 4 are very thin, as explained hereinafter. These figures are enlarged vertically, for clarity of illustration, and are not to scale.

Figure 1:
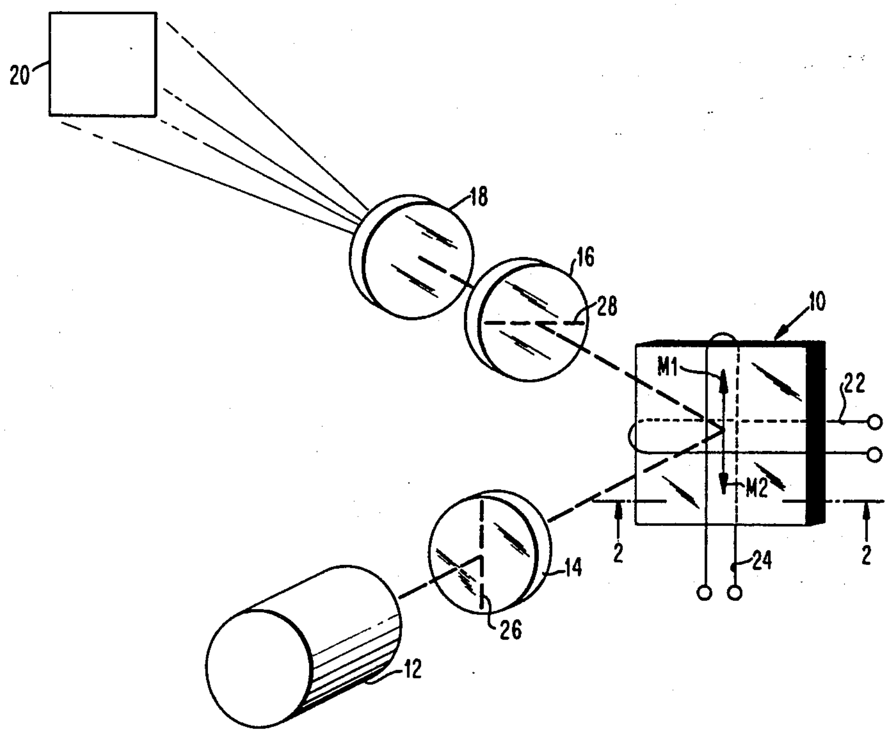
FIG. 1 is a diagrammatic representation of a Kerr magneto-optic device embodying the invention.

Referring to FIG. 1, there is shown a display apparatus including a Kerr magneto-optic reflector 10, in an optical path including a columnated light source 12, a plane polarizing filter 14, the reflector 10, an analyzer filter 16, and a detecting means such as a focusing lens 18 and screen 20.

Means are provided to embody in the reflector 10 a bi-stable characteristic whereby it can adopt, alternately, one or the other of two stable states of magnetization labelled M1 and M2 respectively. Preferably this bistable characteristic is provided by magnetic anisotropy in the reflector material resulting from shape anisotropy and initial processing thereof as set forth hereinafter. For this purpose, the reflector material is in thin film form. Switching means are provided to change the magnetization state of the reflector from that indicated at M1 to the polarity indicated at M2, the illustrated means comprising a first winding 22 which when energized with a current of suitable direction will provide a magnetizing force which is anti-parallel to the previous magnetization state of the reflector material, and a second magnetizing force input in the form of a winding 24 whose magnetic axis is transverse to the "easy" axis M1–M2. Any suitable means (not shown) may be provided for energizing and controlling the switching means 22, 24, such as a battery connected through a corresponding switch to each of the two switching means windings, with the switch for the first winding 22 being double pole so as to enable reversal of the current direction therethrough for selection of the resulting magnetizing force in the desired anti-parallel direction.

The polarizing axes 26, 28 of the polarizing and analyzing filters 14, 16 are shown in approximately crossed relation to indicate the normal employment of the apparatus wherein these filters are set for extinction of light when the Kerr reflector is in one of its two stable states of magnetization, with resulting passage of light through the analyzer filter 16 when the Kerr reflector 10 is in its other state of magnetization. Accordingly, the light as passed by the analyzer filter 16 and detected, such as by the means 18, 20, provides an on-off indicator or display under the control of the magnetization state of the Kerr reflector 10. For simplicity of illustration and discussion, only one Kerr reflector element 10 and single control means 22, 24 therefor have been shown. It will be understood that if desired a mosaic of such elements, separably controllable, may be provided whereby a mosaic alpha-numeric, pictorial, or other graphic display may be had at the screen or other output means 20 of the device. It will be observed that, with two coincident magnetizing forces being employable to switch the magnetization state of any single element of such a reflector, as provided for example by the control windings 22, 24, such a mosaic magneto-optic device lends itself easily to *x–y* coincident current control for practicable decoder controlled operation where the device is used as a display output of a digital computer or the like.

In accordance with one feature of the present invention, the ferromagnetic material of the Kerr reflector, that is, the magneto-optic medium of the apparatus, may include material chosen from the group consisting of higher transition elements and rare earth elements, whereby the $K_1$ value as hereinabove defined of the magneto-optic medium is raised. Accordingly, as shown in FIG. 2, the Kerr reflector may include a glass substrate 30 upon which there is deposited by suitable vacuum deposition or other means a thin film of ferromagnetic alloy 32. For example, the ferromagnetic film 32 may be a film 1,000 Angstroms thick consisting of ninety-two atomic percent iron alloyed with eight atomic percent of platinum, the film being deposited in the presence of a magnetic field to establish an "easy" axis. Experiments with films of this kind have yielded an increase of Kerr intensity by a factor of approximately eight over that which is characteristic of a thin film of iron alone as the Kerr reflector medium. Other tests, wherein the proportion of the heavy atom (e.g. platinum) has been varied, have also yielded improvement over the parent (e.g. iron) constituent alone, as have experiments employing similar alloyed films of other constituents such as nickel-paladium, for example.

In accordance with another feature of the invention, the magneto-optic medium of the Kerr reflector may be built up as a multi-layer film, as shown in FIG. 3. In that figure the reflector device comprises a substrate 34 upon which there are deposited alternate thin layers of iron 36 and of insulator material 38. The insulator material is introduced into the structure as a means for limiting the mean free path of the electrons in the iron film, whereby the value $K_0$ as hereinabove defined is re duced. For example, the iron films 36 may be of pure iron in the order of 25 Angstroms thick while the intervening insulating films may be of magnesium fluoride in the order of seven Angstroms thick, deposited in place by a suitable method such as vacuum deposition means in the presence of a magnetic field. In tests with multilayer films of this type wherein the total multi-layer film was about 1,000 Angstroms thick, an increase in Kerr intensity of a factor of about 12 was found as compared to the Kerr intensity of a pure iron film alone. Other tests, wherein germanium was used for the relatively insulating or electron scattering layers, also yielded improvement.

In accordance with a further feature of the invention the improvements illustrated in FIGS. 2 and 3 and described in relation thereto may be combined, as illustrated in FIG. 4. In this figure a glass substrate 40 has built up upon it a multi-layer film similar to that described in relation to FIG. 3, except that the ferromagnetic portions 42 of the film are of an alloy composition including material chosen from the group consisting of higher transition elements and rare earth elements as in the alloy film 32 of FIG. 2. It will be observed that since the Kerr intensity is a positive function of $K_1$ and an inverse function of $K_0$, then the combined improvements embodied in the arrangement of FIG. 4 result in an overall Kerr intensity which is improved over that of the pure "parent" ferromagnetic constituent alone (e.g. iron or nickel), in accordance with the product of the two improvements.

Referring again to FIGS. 3 and 4, the films 36, 38, 42, 44 thereof need not be continuous so long as the ferromagnetic materials 36, 42 thereof have the desired shape anisotropy to yield the desired magnetic anisotropy and the introduction of insulator material is sufficient to introduce significant reduction of the $K_0$ value. The number of layers and thicknesses thereof may be varied, as may be the materials employed, it being understood however that the respective layers should be individually thin enough to provide substantial transmission of light therethrough, that is, they should be individually significantly transparent. In the Kerr reflector arrangement of the magneto-optic medium of the invention, the overall thickness of the Kerr medium is made thick enough to be reflective since this is the phenomenon utilized. It will be understood that if the Faraday effect is to be used, the thickness of the magneto-optic medium would be reduced to enable significant transmission of light therethrough. Furthermore, although a display apparatus has been shown as a preferred embodiment of the magneto-optic apparatus of the invention, it will be understood that, for example, photoelectric detector means can be substituted for the visual detector means shown whereby the apparatus having as aforedescribed, a bi-stable or memory characteristic, can be utilized in various circuitry employments.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a magneto-optic apparatus, a source of plane polarized light, magneto-optic effect detector means comprising a plane polarizing analyzer filter, and magneto-optic medium means optically between said source and said filter, said medium means comprising a multiplicity of alternate layer means of metallic ferromagnetic alloy and insulating material, said alloy containing first transition element material, and higher atomic number material chosen from the group consisting of higher transition elements and rare earth elements, and each layer means being of a thickness whereby it is significantly transparent to the light of said source so that said light penetrates and emerges from said medium in a light path including a plurality of said ferromagnetic layer means, said higher atomic number material being present in said alloy in the order of twenty-five percent by weight so as to raise the average spin-orbit coupling of the alloy significantly, and said layer means of said alloy being thin compared to the mean free path of the conduction electrons therein, whereby the magneto-optic effect is enhanced.

2. In a magneto-optic apparatus, a source of plane polarized light, magneto-optic effect detector means comprising a plane polarizing analyzer filter, and magneto-optic medium means optically between said source and said filter, said medium means comprising a multiplicity of alternate layer means of metallic ferromagnetic material and insulating material, each of said layer means being of a thickness whereby it is significantly transparent to the light of said source so that said light penetrates and emerges from said medium in a light path including a plurality of said ferromagnetic layer means, and said layer means of said ferromagnetic material being thin compared to the mean free path of the conduction electrons therein, whereby the magneto-optic effect is enhanced.

3. Apparatus as claimed in claim 2, wherein said ferromagnetic material is iron and said insulating material is magnesium fluoride.

4. Apparatus as claimed in claim 2, wherein said ferromagnetic material is iron and said insulating material is germanium.

5. In a magneto-optic apparatus, a source of plane polarized light, magneto-optic effect detector means comprising a plane polarizing analyzer filter, and magneto-optic medium means optically between said source and said filter, said medium means comprising metallic ferromagnetic alloy containing first transition element material, and in the order of twenty-five percent by weight of higher atomic number material chosen from the group consisting of higher transition elements and rare earth elements, whereby said higher atomic number material is present in said alloy in a quantity sufficient to raise the average spin-orbit coupling of the alloy significantly, so that the magneto-optic effect is enhanced.

6. Apparatus as claimed in claim 5, wherein said alloy comprises iron and platinum.

7. Apparatus as claimed in claim 5, wherein said alloy comprises nickel and palladium.

8. In a magneto-optic apparatus, a source of plane polarized light, magneto-optic effect detector means comprising a plane polarizing analyzer filter, and magneto-optic medium means optically between said source and said filter, said medium means comprising metallic ferromagnetic material having electron scattering surface means internally thereof at spacings which are small compared to the mean free path of the conduction electrons of said ferromagnetic material, so as to significantly limit said mean free path and to thereby increase the transparency of said medium, whereby the magneto-optic effect is enhanced.

9. In a magneto-optic apparatus, a source of plane polarized light, magneto-optic effect detector means comprising a plane polarizing analyzer filter, and magneto-optic medium means optically between said source and said filter, said medium means comprising a metallic ferromagnetic alloy in a multiplicity of layer means each in the order of twenty-five Angstrom units thick, said layer means providing a multiplicity of internal surfaces in said medium to increase the transparency of the medium by electron scattering at said internal surfaces, whereby the magneto-optic effect is enhanced.

References Cited in the file of this patent

UNITED STATES PATENTS 2,750,832 Morgan ---------------- June 19, 1956

OTHER REFERENCES

Blois: Preparation of Thin Magnetic Films and Their Properties, Journal of Applied Physics, vol. 26, No. 8; August 1955; pages 975–980.

Williams et al.: Magnetic Writing on Thin Films of MnBi, Journal of Applied Physics, vol. 28, No. 10, pp. 1181–1184, October 1957.

Porter et al.: Transparent Ferromagentic Light Modulator Using Yttrium Iron Garnet, Journal of Applied Physics; vol. 29, No. 3; March 1958; pages 495 and 496.

Olson et al.: Flux Reversal in Thin Films of 82% Ni, 18% Fe; ibid. pp. 274–282.